US010731281B2

(12) United States Patent
Chan

(10) Patent No.: US 10,731,281 B2
(45) Date of Patent: Aug. 4, 2020

(54) HEAT DISSIPATION APPARATUS FOR SEWING MACHINES

(71) Applicant: H. S. MACHINERY CO., LTD., New Taipei (TW)

(72) Inventor: Tzu Sang Chan, New Taipei (TW)

(73) Assignee: H. S. MACHINERY CO., LTD., New Taipei (TW)

( * ) Notice: Subject to any disclaimer, the term of this patent is extended or adjusted under 35 U.S.C. 154(b) by 80 days.

(21) Appl. No.: 16/142,539

(22) Filed: Sep. 26, 2018

(65) Prior Publication Data

US 2019/0226135 A1 Jul. 25, 2019

(30) Foreign Application Priority Data

Jan. 25, 2018 (TW) .............................. 107102728 A

(51) Int. Cl.
*D05B 71/00* (2006.01)
*H02K 9/14* (2006.01)
*F04D 25/08* (2006.01)

(52) U.S. Cl.
CPC ............... *D05B 71/00* (2013.01); *H02K 9/14* (2013.01); *F04D 25/082* (2013.01)

(58) Field of Classification Search
CPC ........ D05B 71/00; D05B 71/02; D05B 71/04; D05B 73/00; D05B 73/005; D05B 73/03; D05B 73/04; H05K 9/14; H05K 9/00; H05K 9/005; H05K 9/02; H05K 9/04; H05K 9/06; H05K 9/10; H05K 9/16; H05K 9/28; F04D 25/082; F04D 25/08

See application file for complete search history.

(56) References Cited

U.S. PATENT DOCUMENTS

| 2,822,123 | A | * | 2/1958 | Cole | ........................ H02K 9/24 417/423.2 |
| 2,836,741 | A | * | 5/1958 | Werner | .................... H02K 9/06 310/59 |
| 4,145,985 | A | * | 3/1979 | Klundt | ................... D05B 71/00 112/280 |
| 4,961,016 | A | * | 10/1990 | Peng | ........................ H02K 9/06 310/59 |

(Continued)

FOREIGN PATENT DOCUMENTS

| CN | 201598412 | 10/2010 |
| CN | 201910703 | 7/2011 |
| CN | 202359356 | 8/2012 |

(Continued)

*Primary Examiner* — Ismael Izaguirre
(74) *Attorney, Agent, or Firm* — Ware, Fressola, Maguire & Barber LLP

(57) ABSTRACT

A heat dissipation apparatus for a sewing machine including a forepart and a motor shaft horizontally projecting out of the forepart includes a sleeve releasably secured to the motor shaft and including a first fan mounted thereon; a stator seat including an axial channel with the sleeve rotatably disposed through, and a plurality of first air inlets; and a guide member fastened between the stator seat and the forepart and including a disc-shaped opening with the first fan rotatably disposed therein. In response to activating the first fan, air is drawn through the first air inlets and a gap between the stator seat and the guide member prior to exiting the forepart.

15 Claims, 6 Drawing Sheets

(56) References Cited

U.S. PATENT DOCUMENTS 6,223,740 B1   5/2001   Kim et al.

FOREIGN PATENT DOCUMENTS

| CN | 103132257 |   | 6/2013 |
|----|-----------|---|--------|
| CN | 104033501 |   | 9/2014 |
| CN | 206015262 |   | 3/2017 |
| CN | 206783956 |   | 12/2017 |
| JP | 2010227218 A | * | 10/2010 |
| TW | M491685 |   | 12/2014 |

* cited by examiner

HEAT DISSIPATION APPARATUS FOR SEWING MACHINES

CROSS REFERENCE TO RELATION PATENT APPLICATION

This application claims priority to Taiwan Patent Application No. 107102728, filed Jan. 25, 2018, the content of which is hereby incorporated by reference in its entirety.

BACKGROUND OF THE INVENTION

1. Field of the Invention

The invention relates to a drive apparatus for sewing machines and more particularly to an improved heat dissipation for a forepart in such apparatus.

2. Description of Related Art

A conventional sewing machine is activated by a motor shaft of an electric motor in cooperation with a pulley. The sewing machine can operate stably and clothing sewn by it has quality.

It is known that the forepart and especially the motor of a sewing machine may generate high levels of heat in operation. There is a need for an apparatus attached to the forepart of the sewing machine for cooling purposes.

SUMMARY OF THE INVENTION

The present invention provides a heat dissipation apparatus for a sewing machine or a cooling module to be attached to an extension shaft which is extended through the forepart of the sewing machine. The cooling module has a sleeve releasably secured to the motor shaft and including first fan mounted thereon; a stator seat including an axial channel with the sleeve rotatably disposed through, and a plurality of first air inlets; and a guide member fastened between the stator seat and the forepart and including a disc-shaped opening with the first fan rotatably disposed therein. In response to activating the first fan, air is drawn through the first air inlets and a gap between the stator seat and the guide member prior to exiting the forepart.

Thus, it is an aspect of the present invention to provide a cooling module which comprises:
a sleeve secured to the extension shaft;
a stator seat secured on the forepart, the stator seat having a first guide end facing the forepart, an opposing second guide end comprising an axial passage, and an inner space between the first guide end and the second guide end for accommodating a stator set, the axial passage dimensioned to receive part of the sleeve; and
a first fan mounted on the sleeve adjacent to the forepart for rotation together with the extension shaft, wherein the stator seat further comprises a plurality of first air inlets arranged to draw air into the stator seat toward the forepart when the first fan rotates.

According to an embodiment of the present invention, the stator seat comprises a chamber having a closed side and an open side, the closed side arranged to provide the axial passage, the stator seat further comprising a flange segment fastened to the forepart, the flange segment having a joining portion connected to the open side of the chamber, and the first air inlets are provided on the joining portion.

According to an embodiment of the present invention, the flange segment includes an inner space to accommodate the first fan, and the chamber has an annular element internally projecting from the open side of the chamber into the segment space of the flange segment, providing a gap between the flange segment and the annular element, the gap arranged to allow the air drawn into the first air inlets to form an airflow toward the forepart.

According to an embodiment of the present invention, the forepart comprises a cavity to receive part of the first fan, the cooling module further comprising a guide member fastened between the flange segment and the forepart, the guide member comprising an opening in communication with the segment space of the flange segment, wherein the guide member is positioned such that the first fan is located between the opening and the sleeve such that the air drawn into the first air inlets form an airflow passing through the gap and then to the opening toward the forepart.

According to an embodiment of the present invention, the forepart further comprises an air outlet in communication with the cavity so as to allow the airflow passing through the gap and the opening to exit through the air outlet.

According to an embodiment of the present invention, the cooling module further comprises a wheel securely mounted on the sleeve facing the second side of the stator seat, the wheel comprising a second fan adjacent to the closed side of the chamber, the wheel further comprising a plurality of second air inlets arranged to draw air through the second air inlets and the second fan to form an additional airflow to cool the stator seat.

According to an embodiment of the present invention, the wheel is spaced from the closed side of the chamber, providing a gap therebetween to allow the additional airflow to exit.

According to an embodiment of the present invention, the cooling module further comprises a stator set fixedly mounted inside the chamber on the stator seat surrounding the rotor for sensing magnetic poles of the rotor when the extension shaft rotates.

According to an embodiment of the present invention, the second fan is integrally formed with the wheel.

According to an embodiment of the present invention, the stator seat comprises a chamber having a closed side, an open side and an inner space between the closed side and the open side, the closed side arranged to provide the axial passage, the open side facing the forepart, the cooling module further comprising a guide member fastened to the forepart, the guide member having a first guide end and an opposing second guide end, the second guide end adjacent to the forepart, the first guide end having an opening in communication with the inner space of the chamber and wherein the first fan is located between the first guide end of the guide member and the forepart.

According to an embodiment of the present invention, the cooling module further comprises a stator set fixedly mounted inside the chamber on the stator seat surrounding the rotor for sensing magnetic poles of rotor when the extension shaft rotates.

According to an embodiment of the present invention, the guide member further comprises a plurality of inlet ports on the first guide end in communication with the opening, the cooling module further comprising a cover arranged to cover the inlet ports, the cover comprising a plurality of holes arranged to draw air through the holes into the inlet ports as an airflow through the opening toward the forepart.

According to an embodiment of the present invention, the guide member further comprises an outlet between the first guide end and the second guide end, the outlet arranged to allow the airflow to exit.

According to an embodiment of the present invention, the cooling module further comprises a second fan fixedly mounted on the sleeve adjacent to the closed side of the chamber, the second fan having an annual part arranged to insert into the axial passage.

According to an embodiment of the present invention, the cooling module further comprises a hood mounted on the sleeve, the hood comprising a plurality of second air inlets arranged to draw air from outside the hood into the second air inlets through the second fan as an airflow to cool the stator seat.

According to an embodiment of the present invention, the hood is mounted on the stator seat having a gap therebetween, allowing the airflow to exit.

DETAILED DESCRIPTION OF THE INVENTION

Figure 1:
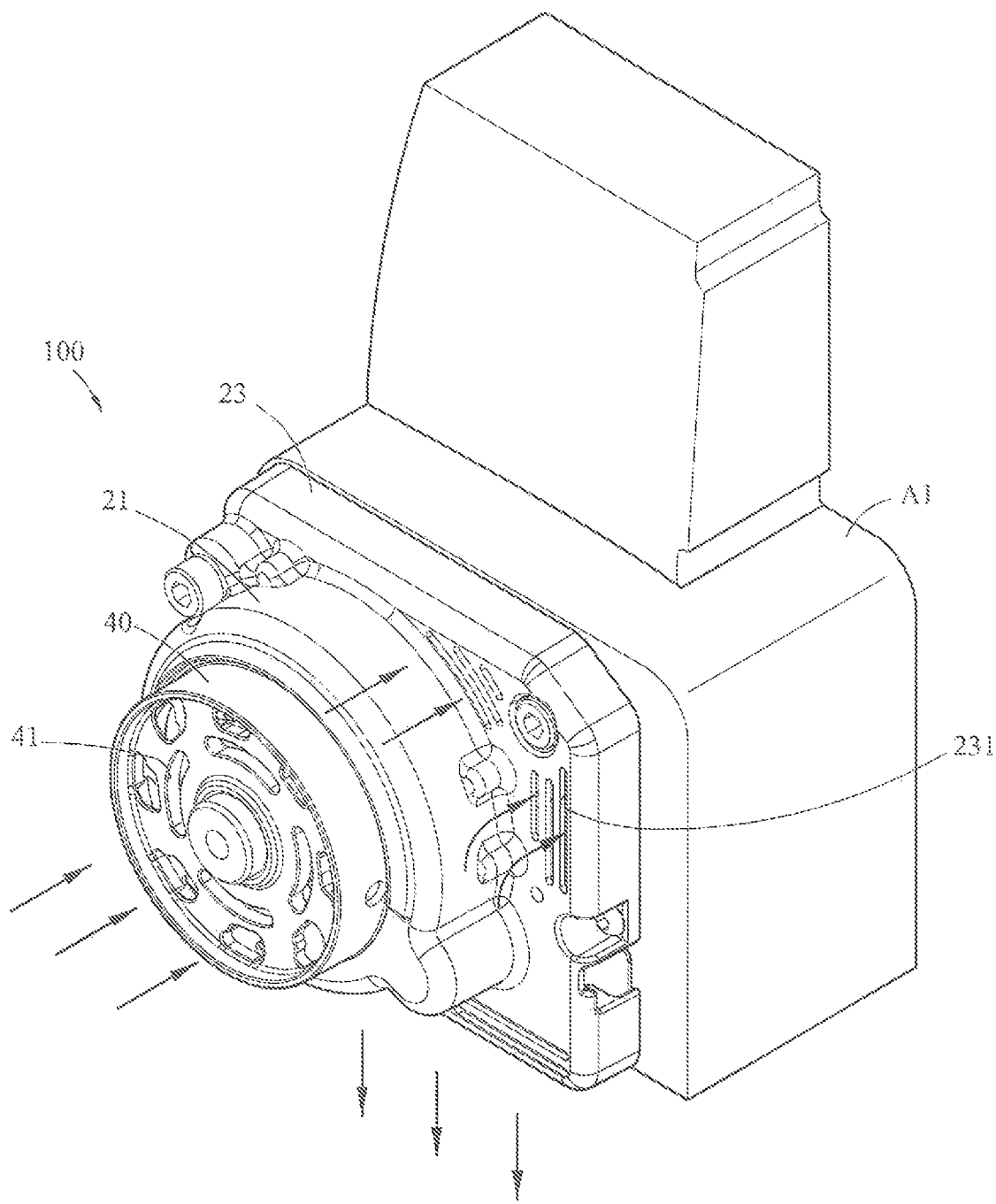
FIG. 1 is a perspective view of a heat dissipation apparatus for a sewing machine according to an embodiment of the invention.
Figure 2:
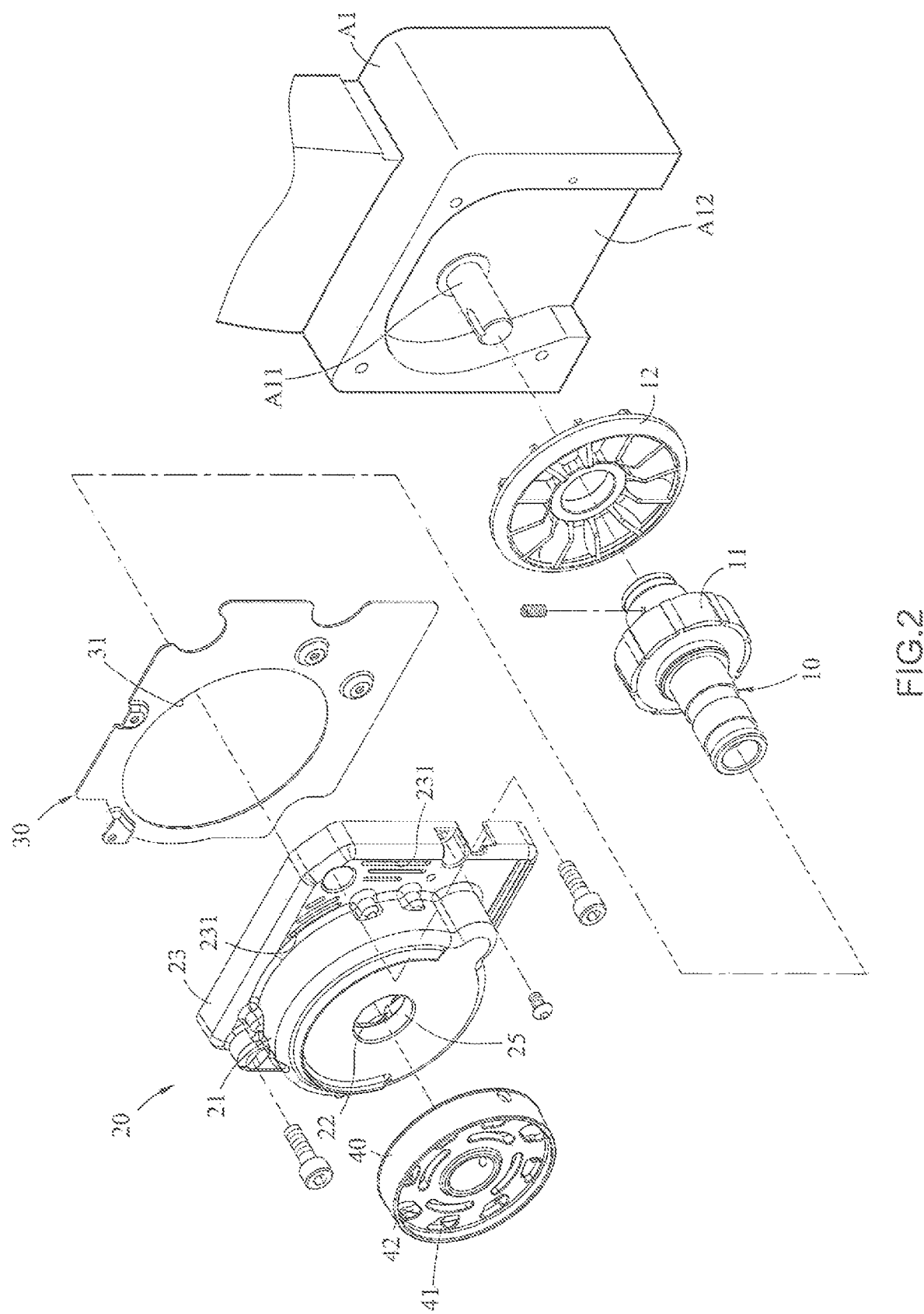
FIG. 2 is an exploded view of FIG. 1.
Figure 3:
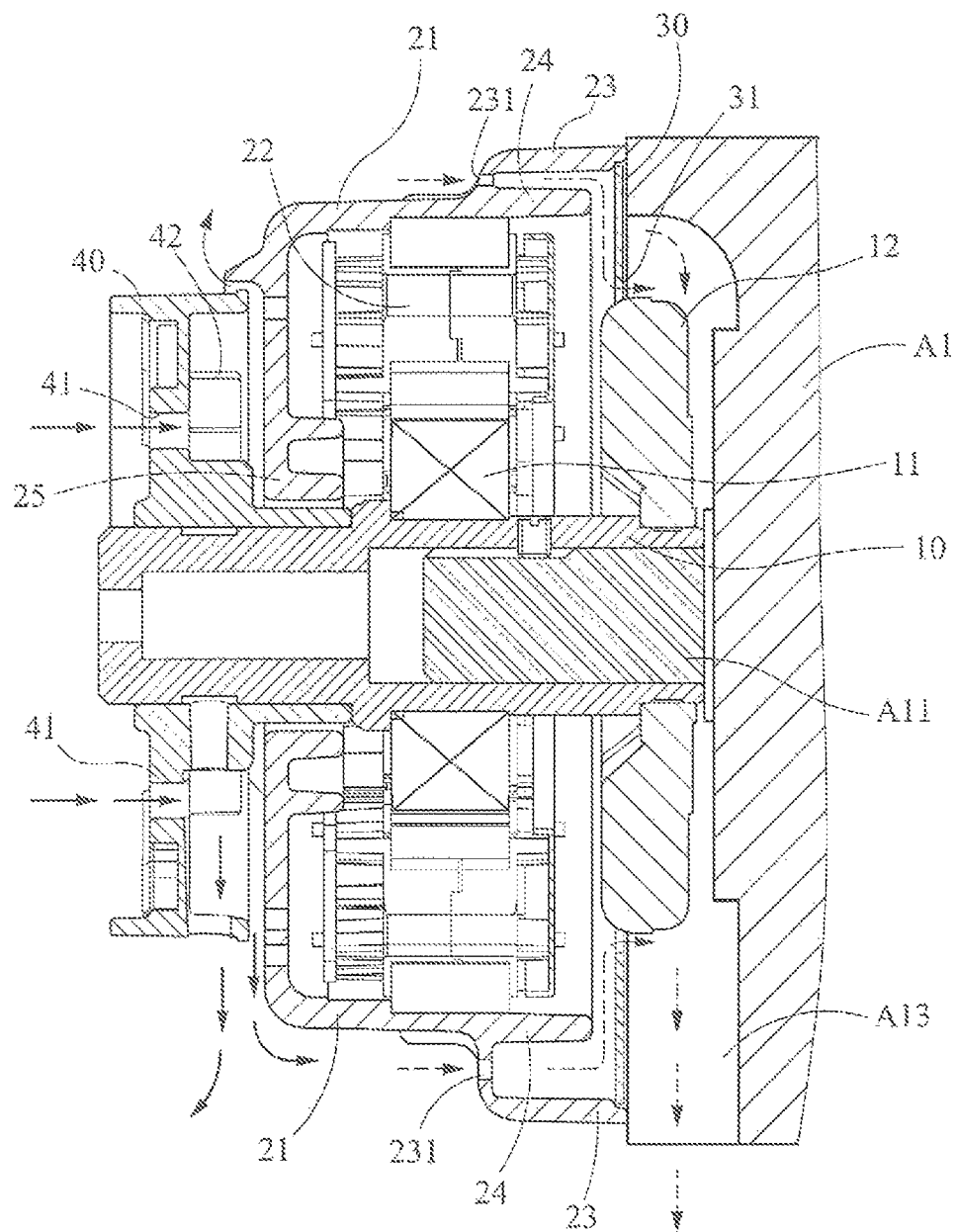
FIG. 3 is a longitudinal sectional view of FIG. 1.

Referring to FIGS. 1 to 3, a drive apparatus 100, according to an embodiment of the present invention, is mounted to a forepart A1 of a sewing machine to provide air passages to allow air to flow therethrough in order to cool the forepart of the sewing machine. The forepart A1 includes a cavity A12 on an inner surface, an extension shaft A11 projecting from the cavity A12 and an air outlet A13 from the cavity disposed at the lowermost end of the cavity, or base of the forepart A1.

The drive apparatus 100 comprises a sleeve 10 secured to the extension shaft A11 so as to be rotatable with the extension shaft A11. The drive apparatus 100 has a rotor 11 disposed on the sleeve 10. The drive apparatus 100 also has a first fan 12 mounted on the sleeve 10, spaced from the rotor 11. The first fan 12 may be at least substantially disposed in the cavity A12 of the forepart A1.

The drive apparatus 100 further comprises a stator seat 20 with a chamber 21. The chamber 21 has a closed side, an open side facing the forepart A1, and an inner space between the closed side and the open side. The inner space of the chamber 21 is dimensioned to accommodate a stator set 22, which surrounds the rotor 11. The stator set 22 is used for sensing the magnet poles of the rotor 11 when the rotor 11 rotates relative to the stator set 22. The stator seat 20 also comprises a flange segment 23 having a joining portion connected to the chamber 21 at the open side of the chamber 21.

As shown in FIG. 2, the flange segment 23 has a plurality of first air inlets 231 provided on the joining portion of the flange segment 23. The chamber 21 has an annular element 24 internally projecting from the open side of the chamber 21 into a segment space defined by the flange segment 23, providing a gap between the flange segment 23 and the annular element 24. The gap allows air to be drawn from the outside of the chamber 21 into the cavity A12 of the forepart A1.

The chamber 21 further comprises an axial passage 25 located at a closed side of the chamber 21 to allow the sleeve 10 to extend through the passage 25.

The drive apparatus 100 further comprises a guide member 30 fastened between the flange segment 23 and the forepart A1. The guide member 30 has an opening 31 communicating with the segment space of the flange segment 23. The guide member 30 is positioned such that the first fan 12 is located between the opening 31 and the sleeve 10.

When the extension shaft A11 rotates, the first fan 12 also rotates. Air is drawn through the first air inlets 231 from outside and passes through the gap between the annular element 24 and the flange segment 23 and then to the cavity A12 as an airflow to cool the forepart A1. The airflow exits the forepart A1 from the air outlet A13.

The drive apparatus 100 may further comprise a wheel 40 fastened on the sleeve 10 with part of the wheel 10 being inserted into the passage 25. The wheel 40 has a plurality of second air inlets 41 and an internally disposed second fan 42 facing the closed end of the chamber 21. The wheel 40 is arranged for manual rotation of the extension shaft A11. When the extension shaft A11 rotates, the second fans 12 also rotates together with the first fans 12. Air is also drawn into the wheel 40 through the second air inlets 41 as an additional airflow to cool the stator seat 20 and the elements therein. The airflow drawn from the second air inlets 41 exits through a gap between the wheel 40 and stator seat 20.

The arrangement of the first air inlets 231 on the flange segment 23 and the second air inlets 41 on the wheel 40 provides two airflows to cool elements in the drive apparatus 100 and the forepart A1 of the sewing machine through different paths, thereby improving the heat dissipation efficiency of the sewing machine.

Figure 4:
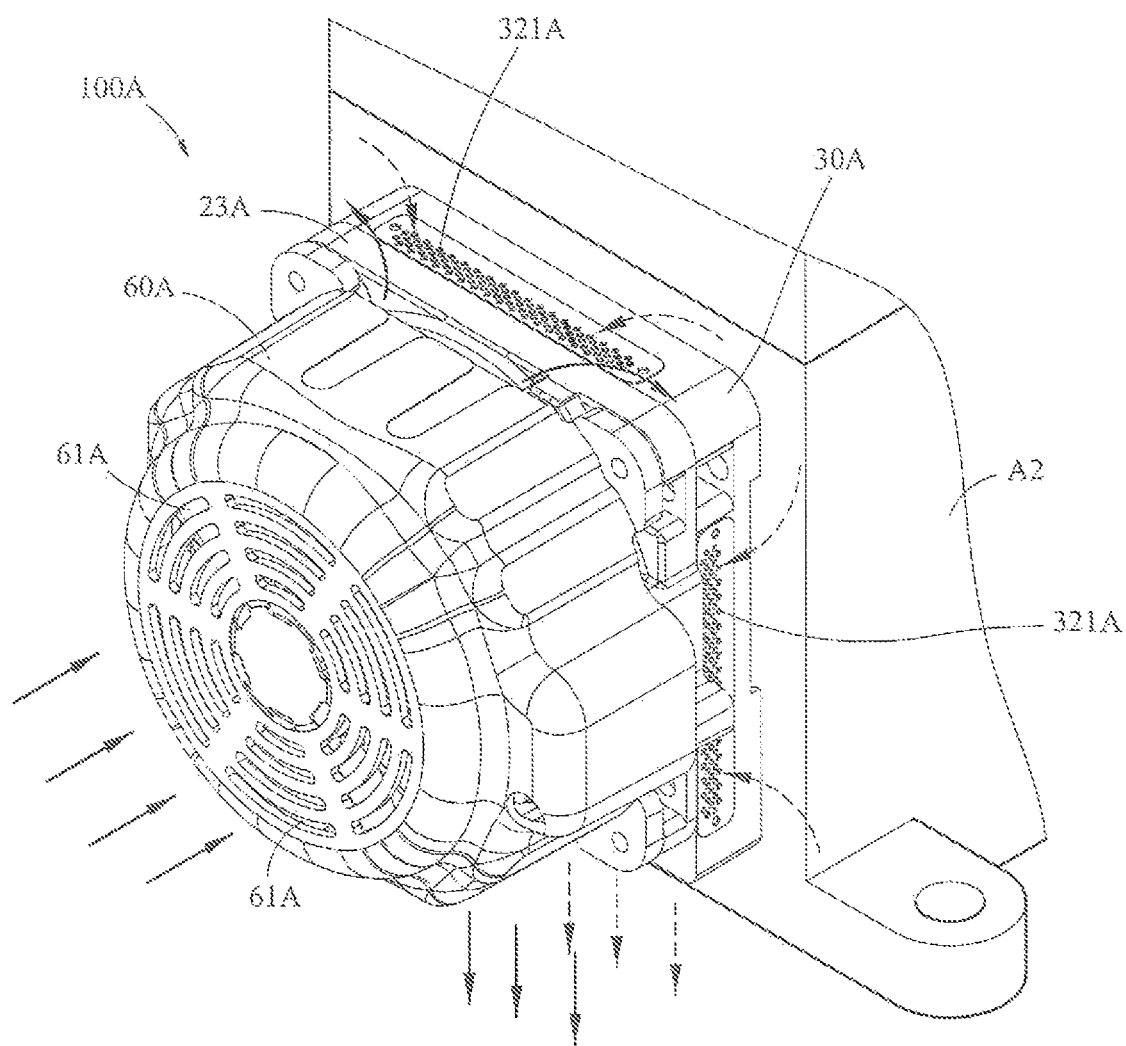
FIG. 4 is a perspective view of a heat dissipation apparatus for a sewing machine according to another embodiment of the invention.
Figure 5:
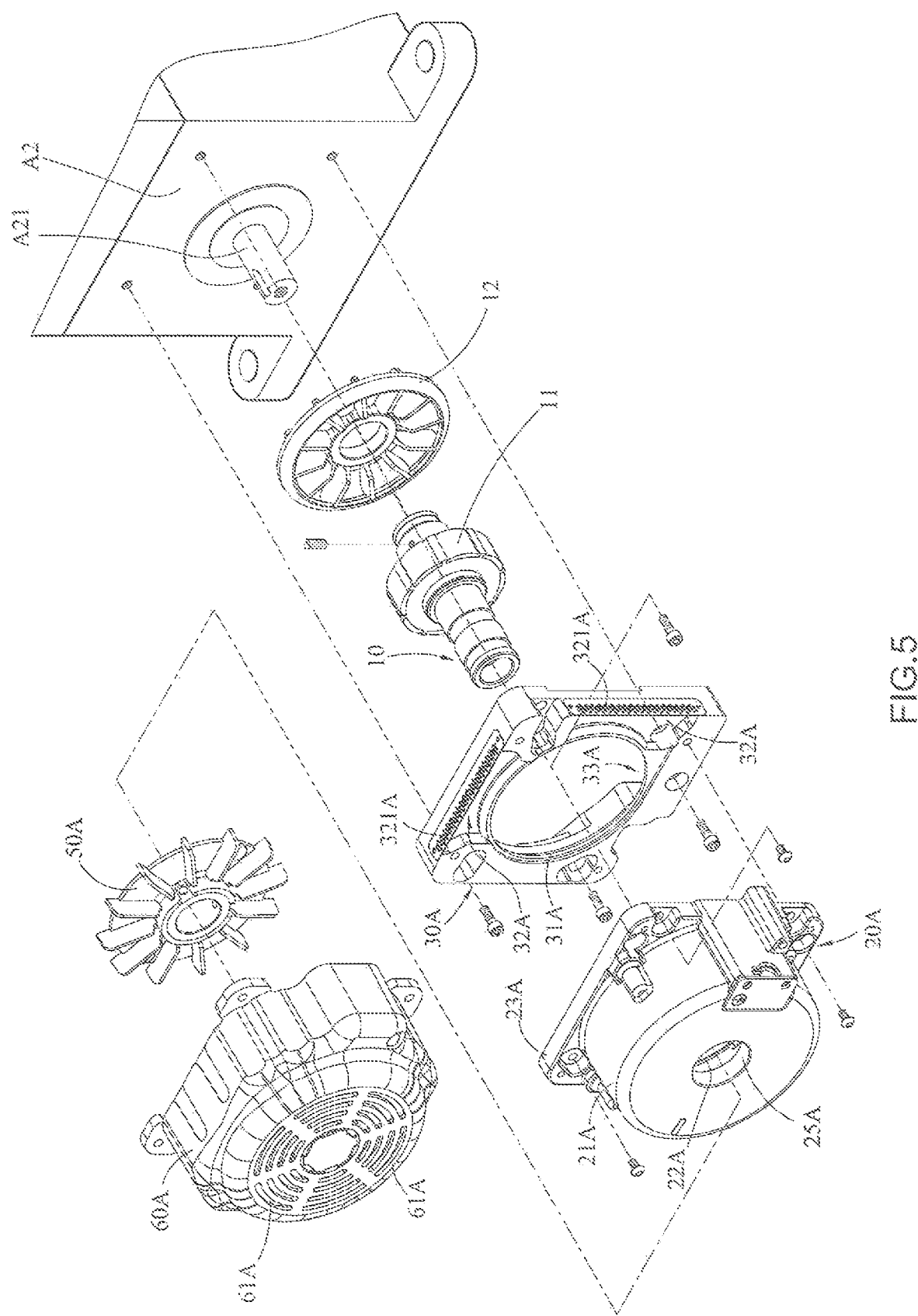
FIG. 5 is an exploded view of FIG. 4.
Figure 6:
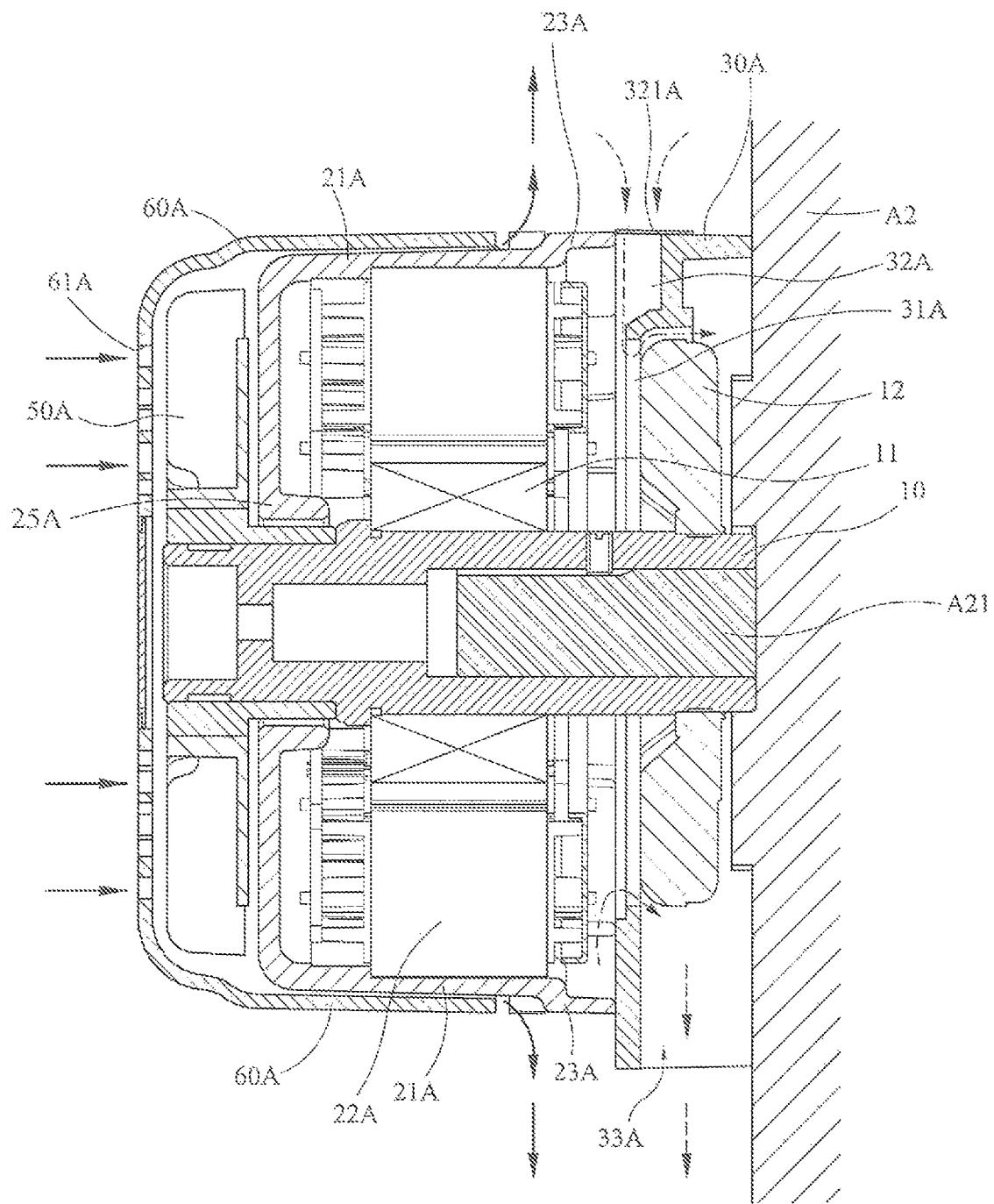
FIG. 6 is a longitudinal sectional view of FIG. 4.

Referring to FIGS. 4 to 6, a drive apparatus 100A, according to another embodiment of the present invention, is mounted to a forepart A2 of a sewing machine. The forepart A2 has a flat outer surface and an extension shaft A21 projecting from the flat outer surface.

The drive apparatus 100A includes a sleeve 10 secured to the extension shaft A21 so as to be rotatable with the extension shaft A21. The drive apparatus 100A has a rotor 11 disposed on the sleeve 10. The drive apparatus 100A also has a first fan 12 mounted on the sleeve 10, spaced from both the rotor 11 and the forepart A2.

The drive apparatus 100A further comprises a stator seat 20A with a chamber 21A. The chamber 21A has a closed side, an open side facing the forepart A2 and an inner space between the closed side and the open side. The inner space of the chamber 21A is dimensioned to accommodate a stator set 22A, which surrounds the rotor 11. The stator set 22A is used to sense the magnet poles of the rotor 11 when the rotor 11 rotates relative to the stator set 22A. The stator seat 20A also comprises a flange segment 23A having a joining portion connected to the chamber 21A at an open end of the chamber 21A, proximate the forepart A2.

The chamber 21A further comprises an axial passage 25A located at the closed side of the chamber 21A to allow the sleeve 10 to extend through passage 25A.

The drive apparatus 100A further comprises a guide member 30A fastened to the forepart A2, located between the flange segment 23A and the forepart A2. The guide member 30A has a first guide end facing the flange segment 23A and a second guide end facing the forepart A2. The guide member 30A includes an opening 31A communicating with the inner space of the chamber 21A. The guide member 30A has two inlet ports 32A on the first guide end of the guide member 30A and an outlet 33A on the second guide end of the guide member 30A.

Each of the inlet ports 32A is a recessed structure, extended from a different selected edge to the opening 31A. The inlet ports 32A are covered by a cover 321A having a plurality of holes to allow air to pass through.

When the extension shaft A21 rotates, the first fan 12 also rotates. Air is drawn through the holes on the cover 321A and the inlet ports 32A and passes through the opening 31A as an airflow to cool the forepart A2. The airflow exits through the outlet 33A of the guide member 30A. It should be noted that the cover 321A is optional as air can be directly drawn through the inlet ports 32A without the cover 321A.

The drive apparatus 110A further comprises a second fan 50A fixedly mounted on a portion of the sleeve 10, with part of the second fan 50A being inserted through the passage 25A. The drive apparatus 100A also has a hood 60A mounted on the stator seat 20A to cover the chamber 21A and the second fan 50A. The hood 60A has a plurality of air inlets 61A to allow air to pass therethrough.

When the extension shaft A21 rotates, the second fan 50A also rotates together with the first fan 12. Air is drawn through the inlets 61A on the hood 60A as an airflow to cool the stator seat 20A and elements inside the stator seat 20A. The airflow exits through a gap between the hood 60A and stator seat 20A. Additionally, air is also drawn through the cover 321A and the inlet ports 32A as an additional airflow to cool the forepart A2.

The arrangement of the inlets 61A on the hood 60A and the holes on the cover 321A provides two airflows to cool elements in the drive apparatus 100A and the forepart A2 of the sewing machine through two different paths, thereby improving the heat dissipation efficiency of the sewing machine.

Although the present invention has been described with respect to one or more embodiments thereof, it will be understood by those skilled in the art that the foregoing and various other changes, omissions and deviations in the form and detail thereof may be made without departing from the scope of this invention.

What is claimed is:

1. A cooling module for used in a sewing machine, the sewing machine comprising a forepart and an extension shaft extended through the forepart for rotation relative to the forepart, said cooling module comprising:
   a sleeve secured to the extension shaft;
   a stator seat secured on the forepart, the stator seat having a first guide end facing the forepart, an opposing second guide end comprising an axial passage, and an inner space between the first guide end and the second guide end for accommodating a stator set, the axial passage dimensioned to receive part of the sleeve;
   a first fan mounted on the sleeve adjacent to the forepart for rotation together with the extension shaft, wherein the stator seat further comprises a plurality of first air inlets arranged to draw air into the stator seat toward the forepart when the first fan is rotation, and
   a wheel securely mounted on the sleeve facing the second side of the stator seat, the wheel comprising a second fan adjacent to the closed side of the chamber, the wheel further comprising a plurality of second air inlets arranged to draw air through the second air inlets and the second fan to form an additional airflow to cool the stator seat.

2. The cooling module of claim 1, wherein the stator seat comprises a chamber having a closed side and an open side, the closed side arranged to provide the axial passage, the stator seat further comprising a flange segment fastened to the forepart, the flange segment having a joining portion connected to the open side of the chamber, and the first air inlets are provided on the joining portion.

3. The cooling module of claim 2, wherein the flange segment includes an inner space for accommodate the first fan, and the chamber has an annular element internally projecting from the open side of the chamber into the segment space of the flange segment, providing a gap between the flange segment and the annular element, the gap arranged to allow the air drawn into the first air inlets to form an airflow toward the forepart.

4. The cooling module of claim 3, wherein the forepart comprises a cavity to receive part of the first fan, the cooling module further comprising a guide member fastened between the flange segment and the forepart, the guide member comprising an opening in communication with the segment space of the flange segment, wherein the guide member is positioned such that the first fan is located between the opening and the sleeve such that the air drawn into the first air inlets form an airflow passing through the gap and then to the opening toward the forepart.

5. The cooling module of claim 4, wherein the forepart further comprises an air outlet in communication with the cavity so as to allow the airflow passing through the gap and the opening to exit through the air outlet.

6. The cooling module of claim 1, wherein the wheel is spaced from the closed side of the chamber, providing a gap therebetween to allow the additional airflow to exit.

7. The cooling module of claim 2, further comprising a stator set fixedly mounted inside the chamber on the stator seat surrounding a rotor for sensing magnetic poles of rotor when the extension shaft rotates.

8. The cooling module of claim 1, wherein the second fan is integrally formed with the wheel.

9. The cooling module of claim 1, wherein the stator seat comprises a chamber having a closed side, an open side and an inner space between the closed side and the open side, the closed side arranged to provide the axial passage, the open side facing the forepart, the cooling module further comprising a guide member fastened to the forepart, the guide member having a first guide end and an opposing second guide end, the second guide end adjacent to the forepart, the first guide end having an opening in communication with the inner space of the chamber and wherein the first fan is located between the first guide end of the guide member and the forepart.

10. The cooling module of claim 9, further comprising a stator set fixedly mounted inside the chamber on the stator seat surrounding a rotor for sensing magnetic poles of the rotor when the extension shaft rotates.

11. The cooling module of claim 9, wherein the guide member further comprises a plurality of inlet ports on the first guide end in communication with the opening, the cooling module further comprising a cover arranged to cover the inlet ports, the cover comprising a plurality of holes arranged to draw air through the holes into the inlet ports as an airflow through the opening toward the forepart.

12. The cooling module of claim 9, wherein the guide member further comprises an outlet between the first guide end and the second guide end, the outlet arranged to allow the airflow to exit.

13. The cooling module of claim 12, further comprising a second fan fixedly mounted on the sleeve adjacent to the closed side of the chamber, the second fan having an annual part arranged to insert into the axial passage.

14. The cooling module of claim 13, further comprising a hood mounted on the sleeve, the hood comprising a plurality of second air inlets arranged to draw air from outside the hood into the second air inlets through the second fan as an airflow to cool the stator seat.

15. The cooling module of claim 14, wherein the hood is mounted on the stator seat having a gap therebetween, allowing the airflow to exit.

\* \* \* \* \*